US010256646B2

(12) United States Patent
Suen et al.

(10) Patent No.: US 10,256,646 B2
(45) Date of Patent: Apr. 9, 2019

(54) SEAT BOX POWER MANAGEMENT

(71) Applicant: Panasonic Avionics Corporation, Lake Forest, CA (US)

(72) Inventors: Paulo Suen, Fullerton, CA (US); Christopher Do, Annandale, VA (US)

(73) Assignee: Panasonic Avionics Corporation, Lake Forest, CA (US)

(*) Notice: Subject to any disclaimer, the term of this patent is extended or adjusted under 35 U.S.C. 154(b) by 99 days.

(21) Appl. No.: 15/584,967

(22) Filed: May 2, 2017

(65) Prior Publication Data
US 2018/0323626 A1 Nov. 8, 2018

(51) Int. Cl.
*B60L 1/00* (2006.01)
*H02J 7/00* (2006.01)
*B60R 16/023* (2006.01)
*B64D 11/00* (2006.01)

(52) U.S. Cl.
CPC .......... *H02J 7/0044* (2013.01); *B60L 1/006* (2013.01); *B60R 16/0238* (2013.01); *B64D 11/00* (2013.01); *H02J 7/0021* (2013.01)

(58) Field of Classification Search
CPC ..................................... B60L 1/006
USPC ......................................... 307/9.1
See application file for complete search history.

(56) References Cited

U.S. PATENT DOCUMENTS

| | | | | |
|---|---|---|---|---|
| 5,754,445 A * | 5/1998 | Jouper | ....................... | H02J 1/14 700/276 |
| 9,229,514 B2 * | 1/2016 | Humphrey | ................ | G06F 1/28 |
| 2004/0021371 A1 * | 2/2004 | Jouper | ................... | H02J 7/0031 307/29 |
| 2006/0004505 A1 * | 1/2006 | Christiansen | ...... | G05B 19/0421 701/49 |
| 2011/0184579 A1 * | 7/2011 | Nilsen | ....................... | H02J 3/14 700/295 |
| 2014/0121850 A1 * | 5/2014 | Pradier | ..................... | H02J 3/14 700/295 |
| 2014/0217811 A1 * | 8/2014 | Jouper | ..................... | H02J 4/00 307/9.1 |
| 2015/0045976 A1 * | 2/2015 | Li | ............................ | H02J 4/00 700/295 |
| 2015/0326134 A1 * | 11/2015 | Jouper | ................... | B64D 11/06 307/9.1 |
| 2016/0306417 A1 | 10/2016 | Greig et al. | | |

* cited by examiner

Primary Examiner — Adi Amrany
(74) Attorney, Agent, or Firm — Brian Furrer

(57) ABSTRACT

A seat box for connection to an electrical power supply of a vehicle for making power available through power controlled outlets for PEDs. The seat box including ports each configured to connect to an outlet, distribution circuitry for distributing power among the ports from the vehicle for supply to an outlet connected to the port; a processor in communication with each port configured to receive and send data to an outlet connected to the port; and a power load manager executed on the processor. The power load manager receives data from each controlled power outlet connected to one of the ports, indicating power supplied from the outlet and requests for power. The power load manager when receiving a request for power from an outlet for which there is insufficient power available to meet the request, controlling the outlet drawing the most power to reduce power, and supplying at least some power to the controlled power outlet from which the request was received.

10 Claims, 3 Drawing Sheets

SEAT BOX POWER MANAGEMENT

CROSS-REFERENCE TO RELATED APPLICATIONS

Not Applicable

STATEMENT RE: FEDERALLY SPONSORED RESEARCH

Not Applicable.

TECHNICAL FIELD

The present disclosure relates to power management, and more particularly to power management on vehicles for supplying power for personal electronic devices of passengers.

BACKGROUND

Personal electronic devices (PEDs) carried aboard vehicles by passengers are requesting increasing amounts of power for charging. Increased power requests affect aircraft more because weight is a critical factor on aircraft and supplying greater amounts of power for charging passenger PEDs reduces the fuel an airplane can use for propulsion. In particular, fuel used for increased electric power generation reduces the amount of fuel left for propelling the vehicle to its destination. Demand for increased power for PEDs on long haul flights is typically even more problematic because PED batteries are more likely to deplete before arrival and therefore require charging from vehicle power for continued use of the PED during flight.

Conventionally, a fixed amount of power has been reserved for usage among outlets on a vehicle. The drawback with this arrangement is that it frequently does not result in a satisfactory distribution of power among PEDs connecting to the outlets. For example, one PED may draw more power than others, and not leave enough power for PEDs charging from other outlets. Hence, improvements are desired.

SUMMARY OF THE DISCLOSURE

In one aspect, the disclosure describes a seat box for connection to an electrical power supply of a vehicle for making power available through power controlled outlets for a personal electronic device to connect to a power controlled outlet and receive power. The seat box includes a plurality of ports in which each port is configured to connect to a controlled power outlet. The seat box also includes distribution circuitry including an input connectable to the vehicle electrical power system, and an output connected to each of the ports for receiving power from the vehicle electrical power system and distributing power among the ports for supply to a controlled power outlet connected to the port. The seat box additionally includes a processor connected in communication with each port configured to receive and send data to a power controlled outlet connected to the port.

The seat box includes a power load manager executed on the processor. The power load manager receives data from each controlled power outlet connected to one of the ports. The data indicates power supplied from the controlled power outlet and requests for power from each controlled power outlet. The power load manager when receiving a request for power from a controlled power outlet for which there is insufficient power available to meet the request, controls the controlled power outlet drawing the most power to reduce power supplied therefrom, and supplies at least some power to the controlled power outlet from which the request for power was received.

In a further aspect, if there is more than one controlled power outlet drawing substantially the same amount of power in which the foregoing amount of power is the most amount of power being supplied by any one controlled power outlet, the power load manager determines which controlled power outlet has been supplying the foregoing amount of power longer than any of the other controlled power outlets. The power load manager controls the determined controlled power outlet to reduce power supplied therefrom.

In a still further aspect, each controlled power outlet reports to the power load manger, connection of a personal electronic device to the controlled power outlet. The power load manager further tracks the duration of time a personal electronic device has been connected to a controlled power outlet based on when a report was received from the controlled power outlet of connection thereto. Each power controlled outlet also reports disconnection of a personal electronic device to the power load manager. In response to a report of disconnection, the power load manager resets the duration of time for that power controlled outlet.

In a different aspect, the disclosure describes a seat box for connection to an electrical power supply of a vehicle for making power available through power controlled outlets for a personal electronic device to connect to a power controlled outlet and receive power. The seat box includes a plurality of ports in which each port is configured to connect to a power controlled outlet. The seat box includes distribution circuitry including an input connectable to the vehicle electrical power system, and an output connected to each of the ports for receiving power from the vehicle electrical power system and distributing power among the ports for supply to a controlled power outlet connected to the port. A processor connected in communication with each port is configured to receive and send data to a power controlled outlet connected to the port.

The seat box includes a power load manager executed on the processor. The power load manager receives data from each controlled power outlet indicating power supplied from the controlled power outlet and requests for power from each controlled power outlet. The power load manager when receiving a request for power from a controlled power outlet, controls the power outlet to supply at least a predefined minimum amount of power, and controls the power outlet to not supply an amount of power beyond a predefined maximum.

In an additional aspect, the seat box includes storage media in communication with the power load manager in which the power load manager establishes the predefined minimum amount of power and predefined maximum amount of power based on values in a configuration file on the storage media. If the power load manager cannot establish a predefined minimum amount of power, the power load manager uses a default value for the minimum amount of power to supply.

In yet a further aspect, the configuration file includes an identification of each type of controlled power outlet, and each controlled power outlet communicates its type to the power load manager. If the identification on the configuration file for a controlled power outlet does not match the identification communicated by that controlled power outlet to the power load manager, the power load manager disables power from the controlled power outlet for which there is not a match.

In still another aspect, the disclosure describes a seat box for connection to an electrical power supply of a vehicle for making power available through power controlled outlets for a personal electronic device to connect to a power controlled outlet and receive power. The seat box includes a plurality of ports in which each port is configured to connect to a controlled power outlet. The seat box additionally includes distribution circuitry including an input connectable to the vehicle electrical power system, and an output connected to each of the ports for receiving power from the vehicle electrical power system and distributing power among the ports for supply to a controlled power outlet connected to the port. The seat box includes a processor connected in communication with each port configured to receive and send data to a power controlled outlet connected to the port.

A power load manager executes on the processor and receives data from each controlled power outlet indicating power supplied from the controlled power outlet and requests for power from each controlled power outlet. The seat box includes storage media in communication with the power load manager in which the power load manager controls distribution of power among the controlled power outlets according to information in a configuration file on the storage media. The distribution is at least one of distributing power to a power controlled outlet first requesting the power with a predefined minimum amount of power supplied in response to another power controlled outlet requesting power later; and redistributing some power from one outlet to another in response to a later request for power.

In an additional aspect, distributing power to a power controlled outlet first requesting the power with a predefined minimum amount of power supplied in response to another power controlled outlet requesting power later, includes controlling the controlled power outlet first requesting power, to not supply an amount of power beyond a predefined maximum. In a further aspect, the power load manager establishes the predefined minimum amount of power and the predefined maximum amount of power based on values in the configuration file.

In a different aspect, redistributing some power from one outlet to another in response to a later request for power is performed when there is insufficient power to meet the later request. In this aspect, the power load manager controls the power outlet drawing the most power to reduce power supplied therefrom, and supplies at least some power to the controlled power outlet from which the later request for power was received. In a further aspect, if there is more than one controlled power outlet drawing substantially the same amount of power in which this amount of power is the most amount of power being supplied by any one controlled power outlet, the power load manager determines which controlled power outlet has been supplying the foregoing amount of power longer than any of the other controlled power outlets, and controls the determined controlled power outlet to reduce power supplied therefrom Other aspects and advantages will become apparent from the following description, taken in conjunction with the accompanying drawings.

BRIEF DESCRIPTION OF THE DRAWINGS

The various features of the present disclosure will now be described with reference to the drawings of the various aspects disclosed herein. In the drawings, the same components may have the same reference numerals. Note that the drawings are not intended to be to scale or show actual quantities of components or relative sizes. The illustrated aspects are intended to illustrate, but not to limit the present disclosure. The drawings include the following figures.

DETAILED DESCRIPTION

As a preliminary note, the terms "component", "module", "system," and the like as used herein are intended to refer to a computer-related and/or information processing entity, either software-executing general or special purpose processor, hardware, firmware and/or a combination thereof. For example, a component may be, but is not limited to being, a process running on a hardware processor, a hardware processor, an object, an executable, a thread of execution, a program, and/or a computer. For example, a controller or control system may be implemented in software, hardware, and/or a combination thereof, and may include a group of two or more control systems working cooperatively.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

Figure 1:
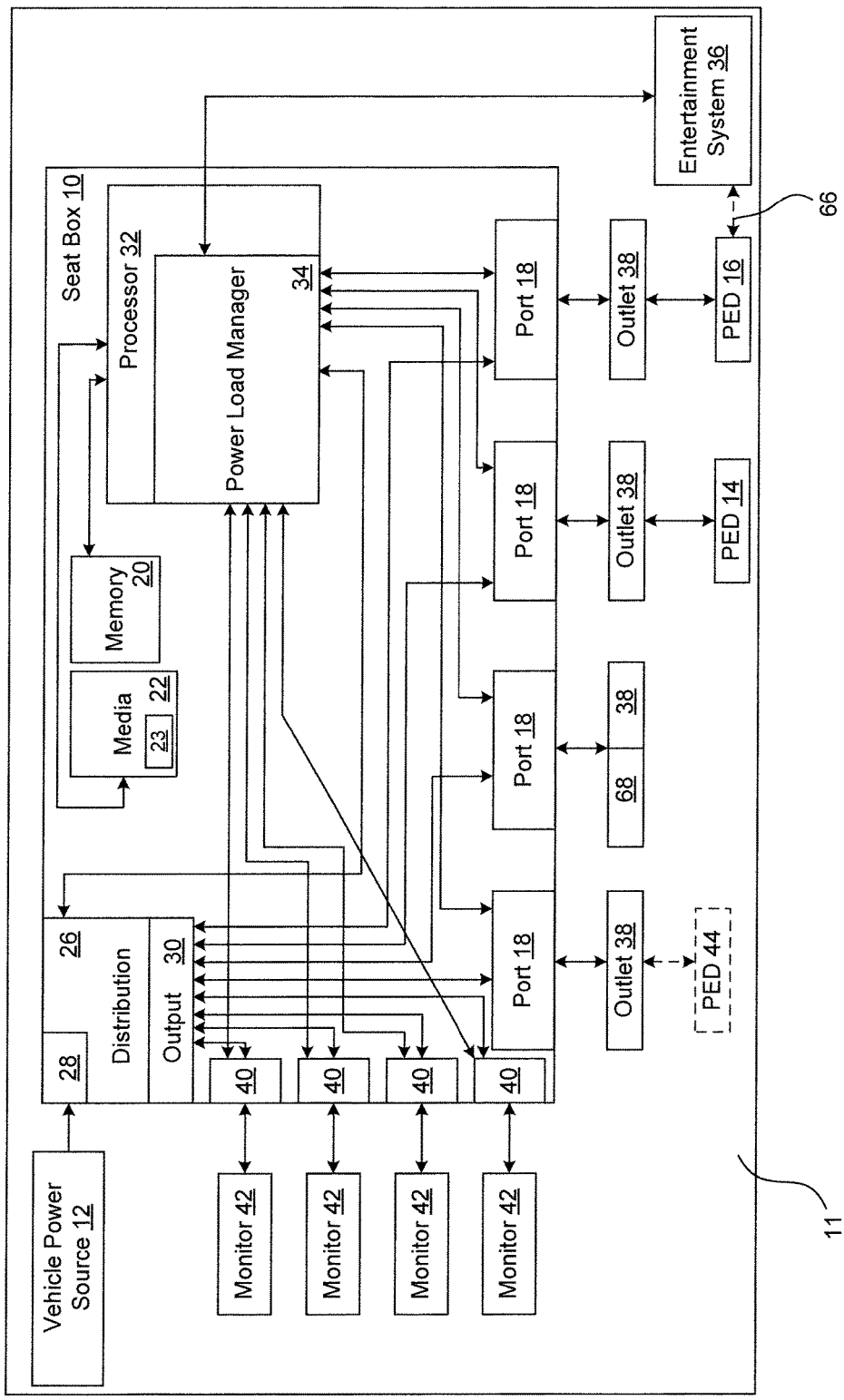
FIG. 1 is a schematic illustration of a seat box on a vehicle.

In one aspect, the following disclosure describes a seat box 10 as schematically illustrated in FIG. 1 for use on a vehicle 11, such as an airplane, ship, train, ferry, bus, or other type of vehicle. While the seat box 10 is not of any particular type, it is contemplated that the seat box 10 will provide greater advantages on vehicles where weight is of more importance, such as on busses and trains, and more particularly on aircraft. On an aircraft, the seat box 10 is preferably a line replaceable unit (LRU) that may be replaced with another seat box 10 in the event of a malfunction, defect, or damager thereto.

With continued reference to FIG. 1, the seat box 10 receives power from a source 12 in the vehicle 11, such as an outlet connected to the electrical system of the vehicle. The seat box 10 may be of any kind, such as a high power supply (HPS) type, direct current seat electric box (DC-SEB) type, high definition or 4K premium seat electric box (HD-PSEB or 4K-PSEB) types, or other types. The seat box 10 receives the power from the vehicle 11 at an input 28 and distributes the power among passenger seats on the vehicle, typically a group or row of seats, to power items at each seat, for example, a reading light, flight attendant call light, monitor, or other items.

On an aircraft, generally the vehicle 11 generates AC power at around 115 VAC, and converts the power to 28 VDC for distribution to the vehicle electrical system and items connecting thereto. The seat box 10 receives the vehicle power at an input 28 and provides it to distribution circuitry 26 for distributing the power through an output 30 to ports 18 and 40 of the seat box 10. The distribution circuitry may also convert the power to a lower voltage, usually from 5 VDC to 3.3 VDC. However, preferably the conversion is performed by the outlets 38. That is, electrical power received from the vehicle power source 12 is provided at the same voltage as received at input 28 to each port 18 and to outlets 38 and 68 connected thereto, and converted by each outlet to an inclusive range between 5 VDC to 3.3 VDC. Power conversion outside of the seat box 10 by the outlets 38 and 68 advantageously reduces heat in the seat box, which may be in area where heat dissipation is difficult such as under a seat or other confined space such as a compartment overhead or in the floor. In alternative configurations, the seat box 10 may receive AC power from the vehicle power source 12, and converts the received power to DC within the seat box 10 via the distribution circuitry.

The seat box 10 includes output ports 18 and 40 connected to the distribution circuitry 26, in which the ports 18 and 40 may be of different types. The first type of port 18 is configured for connection to a power outlet 38, preferably a controlled power outlet 38, but which could also include a static power outlet 68. Examples of power controlled outlets 38 are types of outlets capable of communicating negotiated power usage and implement USB Power Delivery 3.0 protocol or later. Generally these outlets (also known as jacks) have flexibility for a broad range of operability and pass at least current power usage data and power requests from a personal electronic device (PED) 14 or 16 back to the seat box 10. The PEDs 14 or 16 described herein refer generally to electronics devices that use a USB protocol for charging. The USB protocol for charging include at least USB 2.0/BC1.2, and a protocol or protocols based on USB power delivery.

The controlled power outlets 38 draw power from a source, if permitted to by command/control from the seat box 10. The controlled power outlets 38 include USB Type C outlets or jacks. The first type of ports 18 of the seat box 10 may also connect to non-controlled power outlets. Non-controlled power outlets include Type A USB outlets/jacks operating in High Power mode or USB Type C outlets/jacks implemented without a data line (or a disabled data line). The USB outlet/jacks are for charging a PED 14 or 16, which may be a mobile phone, tablet computer, phablet (larger sized mobile phone nearing tablet-size), laptop computer, or other kind of PED connectable to a USB outlet for charging therefrom.

Another kind of port 40 is illustrated in FIG. 1 and is optional. The foregoing ports 40 are for vehicles providing monitors 42 at passenger seats. For instance, the vehicle 11 may include an entertainment system 36 (called an inflight entertainment system or IFE system on aircraft), including monitors 42 mounted at seatbacks, bulkheads, or armrests of seats, for use by passengers. For vehicles 11 having monitors 42 for passenger use, these ports 40 supply the monitors with power. Vehicles used over shorter distances, such as aircraft for short haul flights, may not have monitors 42, in which case the ports 40 are not necessary and may be removed to reduce cost and weight of the seat box 10. If ports 40 are included, the ports preferably report power supplied therefrom to the power load manager 34.

Each seat box 10 includes a data processor 32 and memory 20 connected to the processor. The memory may be SDRAM, NVRAM, a combination thereof, or other type. The seat box 10 also includes storage media 22 connected to the processor for non-volatile storage of data when the vehicle is powered down or power is otherwise not available from the vehicle power source 12. The storage media 22 may be flash memory, an SSD, hard disk drive, or other type of media for non-volatile storage of data. A ROM or EEPROM may be included for non-volatile data storage as well, either alone or in combination with other non-volatile storage media. The processor 32 is connected in communication with each port 18 and 40 of the seat box 10. The processor 32 executes program logic, including a software application referred to hereafter as a power load manager 34. The processor 32 is preferably a low power type, such as an ARM processor, but may be other types as well, such as an Intel or AMD type processor, preferably a type intended for low power or mobile use.

When the power load manager 34 is executed by the processor 32, the power load manager receives data from each controlled power outlet 38 connected to a port 18. The data received from each controlled power outlet 38 indicates the power supplied from the controlled power outlet and requests for power from the controlled power outlet. For example, a PED 14 may connect to the third controlled power outlet 38 in FIG. 1 (counting from right to left) and request power. The controlled power outlet 38 communicates data corresponding to the request, which is communicated to the port 18 and to the power load manager 34. Existing power usage is also communicated. For example, if there was no PED previously connected to the controlled power outlet 38, data indicating zero supply of power would be communicated to the power load manager 34. However, even when an outlet 38 is not supplying any power to a PED, some minimal amount of power is provided to the outlet 38 for operation of a microcontroller within the outlet and other electronics/circuitry for sending and receiving communications by the outlet.

The power load manger 34 after receiving a request for power from a controlled power outlet 38 for which there is insufficient power available to meet the request, responds by commanding or controlling the controlled power outlet drawing the most power to reduce power supplied therefrom, and commanding/controlling supply of at least some power to the controlled power outlet 38 from which the request was received. For example, there may be another PED 16 previously connected to a controlled power outlet 38 drawing power. If this controlled power outlet 38 is drawing the most power based on the data received from the controlled power outlets, the power load manager 34 will communicate data to that controlled power outlet 38 to reduce the amount of power supplied therefrom. The power load manager 34 thereafter communicates data to the other controlled power 38 to supply at least some power, which is supplied to the requesting PED 14.

The controlled power outlet 38 from which the request originated, may not have been supplying power, i.e., drawing power from the seat box 10. However, each controlled power outlet 38 reports or communicates data to the power load manager 34 upon connection of a PED 14 or 16. Thus, the power load manager 34 is able to provide at least some power for a later requesting PED 14.

If there is more than one controlled power outlet 38 drawing substantially the same amount of power in which the foregoing amount power is the most amount of power being supplied by any one controlled power outlet, the power load manager 34 determines which controlled power outlet has been supplying the foregoing amount of power longer than any of the other controlled power outlets. The power load manager 34 thereafter commands/controls the controlled power outlet 38 that has been supplying power for the longest duration to reduce power supplied therefrom. The power load manger 34 thereafter communicates to the other controlled power outlet 38 to supply at least some power to the requesting PED 14 or 16. In this regard, the power load manager 34 tracks the duration of time a PED 14 or 16 has been connected to a controlled power outlet 38 based on when a report or communication was received from a controlled power outlet of a connection thereto. Similarly, the power load manager 34 tracks disconnection of a PED 14 or 16. In response to a report or communication of disconnection, the power load manager resets the duration of time for the power controlled outlet 38 from which the report or communication was received.

In the event, two or more outlets 38 have been connected for equal amounts of time and each outlet is supplying an equal amount of power, in which the foregoing amount of power is the greatest amount being supplied compared to the remaining outlets, the power load manger 34 randomly selects one of the two or more outlets, i.e., outlets that have been connected for the same duration, supplying the same amount of power, in which the amount of power is greater than the power amount supplied by any of the remaining outlets. Thereafter, the power load manger 34 controls the selected outlet 38 to reduce the power supplied therefrom as described above.

The power load manager 34 communicates a power data object to a PED 14 or 16 connected to a power controlled outlet 38 indicating a power limit for that power controlled outlet. The power data object is part of the data communicated between the PED 14 or 16 and a controlled power outlet 38, initiated upon connection of a PED to a controlled power outlet. The data includes a power data object communicated from the load power manager 34 to the PED 14 or 16 via a port 18 and outlet 38, indicating the maximum amount of power that may be drawn from the outlet. The PED 14 or 16 communication likewise includes a power data object, indicating the power requirements for the PED. The load power manager 34 communicates another power data object to a power controlled outlet 38 for which power supplied therefrom is to be reduced, indicating the new power limit.

As will be appreciated, the seat box 10 implements a more balanced power distribution. The seat box 10 is advantageously able to redistribute power already being supplied to a PED 14 or 16, to a later requesting PED. Redistribution is performed when there is insufficient power to meet the amount requested by the later requesting PED. The total power available from a seat box 10 must be reduced for the power allocated to IFE equipment, e.g., monitors 42, reading light, or other equipment, and base power for each controlled power outlet 38. Some power may further be reserved as a minimum available for each power outlet 38 connect to a port 18. The load power manager 34 can flexibly distribute the remaining power based on request and usage as described above.

The amount of power reduction for an outlet 38 is preferably at least 5 W, and more preferably a minimum amount consistent with most power rule increments provided in the USB power delivery standard. For this reason, the minimum preferred is more preferably 15 W plus an amount to compensate for losses due to inefficiency of the outlet 38. The power load manager 34 communicates the power reduction to each affected outlet 38 via a newly communicated power data object.

A non-limiting illustrative example follows. Assume PEDs 14 and 18 are both connected to the seat box 10 through respective power controlled outlets 38 in which each outlet has an efficiency of 90%. Moreover, the seat box 10 has available power totaling 133.2 W. Moreover, assume each PED 14 and 16 requests 60 W. As each outlet 38 has an efficiency of 90%, the seat box 10 must supply 66.6 W to each outlet 38 to meet a request for supplying 60 W to each PED (90% of 66.67 W is approximately 60 W). The seat box 10 is able to fulfill the request as 66.67 W supplied to via outlets 38 to each PED 14 and 16 is a total of approximately 133.2 W (two times 66.67 W).

If a PED 44 (shown in dotted line) connects to another outlet 38 and requests power, there is insufficient power to meet the request as all of the power has been allocated to fulfill the requested power for the two PEDs 14 and 16 that connected earlier. In response, the power load manager 34 follows the process described previously. Specifically, the power load manager 34 determines which controlled power outlet 38 is drawing the most power. In this example, there is more than one controlled power outlet 38 drawing substantially the same amount of power in which the amount of power is the most amount of power being supplied by any of the remaining controlled power outlets.

The power load manager 34 therefore further determines which controlled power outlet has been supplying this amount of power longer than any of the other controlled power outlets. Assume one of the PEDs 14 or 16, has been connected for sixty minutes and drawing power from its respective outlet 38, while the other PED has been connected for only thirty minutes and drawing power from its outlet. The power load manager 34 in response to this determination will control the outlet 38 for the PED 14 or 16 that has been connected the longest to reduce the power supplied from the outlet. As described above, the amount of power reduction for the outlet 38 is preferably at least 5 W, and more preferably 15 W plus an amount to compensate for loss due to inefficiency of the outlet. Since the outlet 38 has an efficiency of 90% in this example, the amount of power reduction is (15 W)/0.90, or approximately 16.67 W.

The power load manager 34 thereafter controls the outlet 38 to reduce power supplied therefrom from 66.6 W minus 16.67 W, i.e., a reduction to approximately 50 W. Further, the outlet 38 from which the request was received from PED 44, is allocated the amount of the reduction, i.e., 16.67 W. This may continue in an iterative process if PED 44 requests additional power, or another PED connects to another outlet 38. The power load manager 34 controls the power supply through the ports 18 and outlets 38 by communicating data including modified power data objects.

Figure 2:
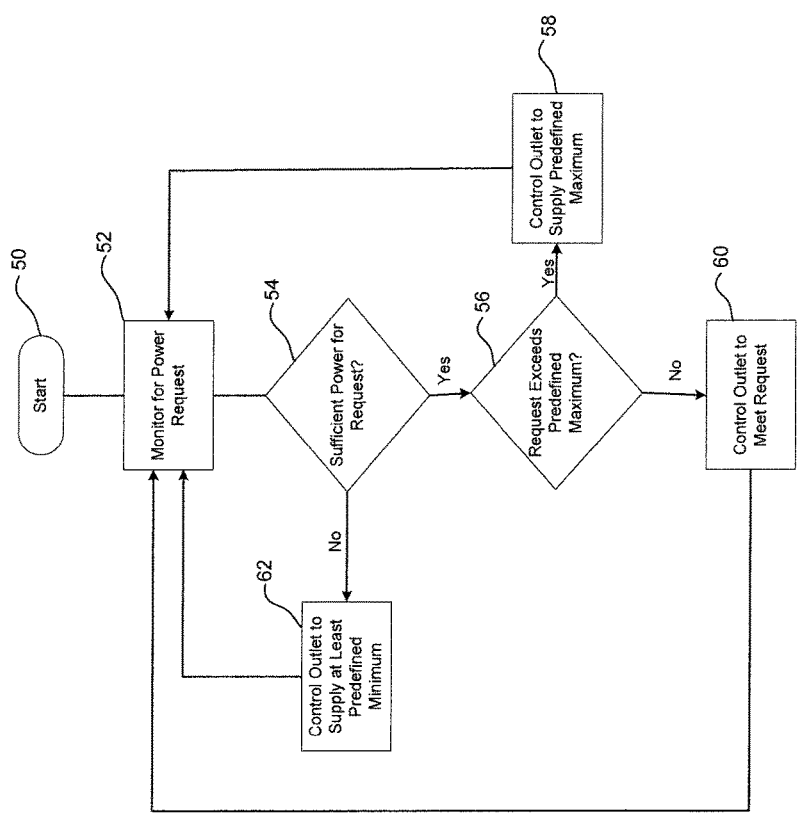
FIG. 2 is a schematic illustration of a process for distributing power.

The power load manager 34 may be configured to distribute power according to an alternative method or process. The process is schematically illustrated in FIG. 2 and uses the same components as previously described. The process begins after a start block 50 in which the power load manger 34 has commenced execution by processor 32. In particular, after startup in block 50, the power load manager 34 monitors for a new power request in block 52. In response to a request, the power load manager 34 determines whether there is sufficient power to meet the request in decision block 54. If the power load manager 34 determines there is sufficient power available to meet the request, the process proceeds to decision block 56 and determines whether the request exceeds a predefined maximum amount of power. For example, a PED 14 or 16 may request 70 W. However, a predefined maximum may be enforced by the power load manager 34 to restrict each outlet 38 to supplying no more than a predefined maximum of 45 W. In this example, the request exceeds the foregoing exemplary predefined maximum of 45 W, and therefore the process proceeds to block 58, in which the power load manager 34 controls the outlet 38 to supply the predefined maximum. Thereafter, the process returns to block 52 and monitors for another power request. If the determination in decision block 56 is that the request does not exceed the predefined maximum, the process proceeds to block 60 controlling the outlet 38 to meet the request. Thereafter the process returns to block 52 and monitors for another request.

Returning to decision block 54, if the determination is that there is not sufficient power for the request, the process proceeds to block 62 and controls the outlet 38 to supply at least a predefined minimum amount of power. The predefined minimum amount of power is preferably a minimum amount consistent with most power rule increments provided in the USB power delivery standard. For this reason, the predefined minimum amount is preferably at least 15 W plus an amount to compensate for losses to inefficiency of the outlet 38. The power load manager 34 controls the outlet 38 to supply the predefined minimum amount by communicating the power to be supplied by the outlet 38 via a power data object. If there is power available greater than the predefined minimum amount, but less than the requested amount, the power load manager 34 may be configured to control the outlet 38 to supply an amount of power great than the predefined minimum, but less than the requested amount. Thereafter the process returns to block 52 and monitors for another power request.

The advantage of the process illustrated by FIG. 2 is that it provides power on a first-come, first-served basis, with upper and lower bounds. There is a predefined maximum to prevent any one outlet 38 from using all of the power, with a predefined minimum provided for outlets 38 to which a PED 14 or 16 is connected to later. Hence, it provides for a fairer distribution of power over a mere first come, first served basis.

As described previously in connection with FIG. 1, seat box 10 includes storage media 22. The power load manger establishes the predefined minimum amount of power and predefined maximum amount of power based on values in a configuration file 23 on the media 22. If the power load manager 34 cannot establish a predefined minimum amount of power, for example, the configuration file 23 is missing or cannot be read, the power load manager uses a default value. The default value is preferably at least 5 W, and more preferably at least 15 W for reasons previously described, plus an amount to account for inefficiency of the controlled power outlet 38.

The configuration file 23 further includes an identification of each type of controlled power outlet 38. Each controlled power outlet 38 communicates its type to the power load manager 34. If the identification on the configuration file 23 for a controlled power outlet 38 does not match the identification communicated by that controlled power outlet to the power load manager, the power load manager power 34 disables power from the power controlled outlet for which there is not a match. The power may be disabled by the power load manager 34 communicating a power data object to the controlled power outlet to not supply power. Alternatively, the power load manager may be configured to control the distribution circuitry 26 to disable power to the controlled power outlet 38, both by communicating a power data object and communicating with the distribution circuitry 26 to disable power, for example, by activation of a switch to cut power in the distribution circuitry.

The seat box 10 is typically installed in a vehicle 11 and connected in communication with the vehicle entertainment system 36. In an aircraft, the entertainment system 36 is frequently referred to as an IFE (inflight entertainment) system or an IFEC (inflight entertainment and communication) system. Communication between the seat box 10 and the entertainment system 36 is preferably via Ethernet, but may be in accordance with other protocols. In addition, the seat boxes 10 may be connected in communication with one another either directly or indirectly via Ethernet.

The power load manager 34 of the seat box 10 is further configured to receive a communication from the entertainment system 36 for a priority request for power for one of the controlled power outlets 38. If the power load manager 34 receives a priority request for a controlled power outlet 38 from the entertainment system 36, the power load manager controls the foregoing power outlet 38 to provide a fixed power amount output for a predefined duration, and decreases the power available for the remaining power controlled outlets to accommodate the priority request. The priority request may be due to a PED 16 communicating a request 66 to the entertainment system 36. Entertainment systems 36 frequently include wireless access points (WAPs), for receiving communications from PEDs 14 or 16. The vehicle operator or carrier may have made available a downloadable software application fora PED 14 or 16, which after installation thereof, the software application may be used to submit a request for priority power to the entertainment system 36 in return for a fee or use of loyalty rewards, e.g., frequent flying miles, points, or other promotion. If the monitors 42 are included, the request may be submitted via the monitor at a seat.

In another aspect, the seat box 10 may include a static outlet 68 or several static outlets 68. Static outlets 68 may be provided in combination via a multiport outlet, which provide both a static outlet 68 and a controlled power outlet 38. If the seat box 10 includes a static outlet 68, the load power manager 34 allocates a fixed amount of power for the static power outlet. However, the load power manager 34, continues to command or control the amount of power supplied by controlled power outlets 38 and reduce or increase power thereto as more or less power becomes available due to requests for power or disconnection of PEDs 14 or 16.

Since the seat box 10 includes media 22 from which a configuration file 23 is read, operation of the power load manager 34 may be reconfigured or modified by changing or replacing the configuration file on the media. As described earlier, the seat box 10 is connectable in communication with the entertainment system 36. If it is desired to change the configuration of the power load manager 34, this can be performed by communicating a configuration file 23 from the entertainment 36 to each seat box 10. Configuration files 23 may be stored by the entertainment system 36 and provided for selection by vehicle crew members from a crew management interface (CMI) as typically provided on entertainment systems 36. Typically, the CMI is provided as a monitor mounted for crew use and/or as a web-accessible interface via an application installed on PED's used by crew. Alternatively, configuration files 23 may be stored in the media 22 of each seat box 10, with a selection being made via the CMI of the entertainment system 36 of which configuration file the load power manager 34 thereof should use. Selection could be provided via class of service, i.e., premium or economy, or other factors, such as premium economy seating.

For example, the CMI may provide a selection for very important persons (VIPs), critical use, or for high ranking passengers in an operator's or carrier's loyalty program, such as a "gold" or "platinum" member passenger of a frequent flyer program. In this example, a vehicle crew member could select VIP or critical use for a seat and the port 18 of a seat box 10 corresponding to the selected seat. In response to the selection, the load power manager 34 commands or controls the outlet 38 connected to that port 18 to provide the maximum amount of power supported by the outlet, and correspondingly reduces the power to other outlets of that seat box 10. A critical use might be a passenger transporting a mobile refrigerator containing medical materials that must remain chilled, or a laptop or communication equipment that must remain on.

In a further example, the vehicle carrier or operator may select certain seat or seats for constant or static critical use, such as for a refrigerator, laptop, communication equipment or other item connected to the outlet 38 of a seat. In this further example, the seat box 10 corresponding to each selected seat is provided with a configuration file causing the power load manger 34 to control the outlet 38 of the selected seat to provide the maximum amount of power supported by the outlet, and reduce power by a corresponding amount for the other outlets of the seat box 10. If a seat is later deselected for constant/static critical use, the configuration file 23 may be changed by communication with the IFE system 36, to provide a different configuration file 23 in which there are no outlets 38 having priority over others.

As described previously, the storage media 22 is in communication with the power load manager 34 in which the power load manger controls distribution of power amount controlled power outlets according to information in a configuration file 23 on the storage media. The distribution is at least one of (i) distributing power to a power controlled outlet 38 first requesting the power with a predefined minimum amount of power supplied in response to another power controlled outlet requesting power later; and (ii) redistributing some power from one outlet to another in response to a later request for power. The distribution could include other alternatives, such as static or first come, first served instead of the previously described distributions, or providing priority for an outlet 38, also as previously described.

Figure 3:
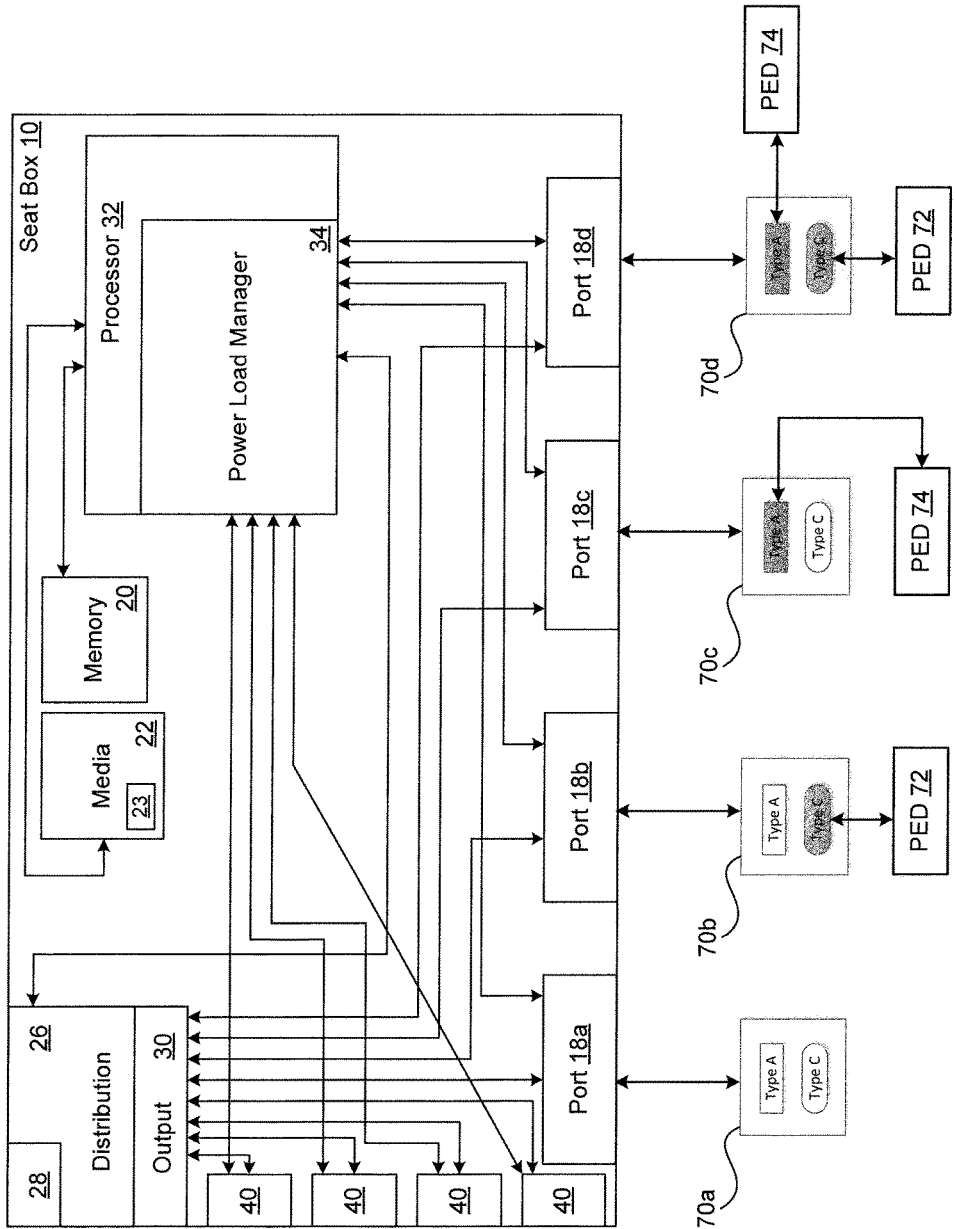
FIG. 3 is a schematic illustration of an example power distribution from a seat box.

FIG. 3 schematically shows an illustrative example of a static power distribution for a seat box 10 including ports 18a through 18d in which controlled power outlets 70a through 70d have been respectively connected (alphabetic identifiers have been included for convenience of explanation). The storage media 22 has stored on it a configuration file 23 for a static power distribution according to which the power load manager controls distribution of the power to each of the ports 18a through 18d. As show in FIG. 3, each outlet 70a through 70d includes both a USB Type A and Type C jacks for respectively connecting a PED 72 and 74. In particular, a PED 72 has been connected to a USB Type C jack on each of outlets 70b and 70d. A PED 74 has been connected to a USB Type A jack on each of outlets 70c and 70d. The power load manager 34 is connected in communication with each outlet 70a through 70b and the distribution circuitry provides power to each outlet from output 30 (for convenient explanation, the vehicle power source is not shown in FIG. 3).

For the example, assume that the seat box 10 has 120 W available for distribution to the ports 18a through 18d. Since this is a static distribution and there are four ports 18a through 18d, each port is allocated 30 W, i.e., one-fourth of the total 120 W available from the seat box 10. For the example, assume that each Type A jack provides up to 10.5 W in use and that each outlet 70a through 70d has an efficiency of 90%. As there is a single PED 72 connected to the USB Type C port of outlet 70b, and nothing connected to the USB Type A port, the power load manager 34 controls the outlet 70b to communicate to the PED a power data object indicating a power limit of 27 W, i.e., ninety percent of 30 W, or a limit of 27 W.

At outlet 70c, there is a single PED 74 connected to the USB Type A jack of the outlet, and nothing connected to the USB Type C port. However, the USB Type A port is a non-controlled power outlet. Therefore, it provides a static amount of power limited to 10.5 W if a PED or other device is connected thereto.

Moving to outlet 70d, there is a PED 72 connected to the USB Type C jack, and a PED 74 connected to the USB Type A jack. The total allocation of 30 W for the outlet 70d is therefore shared between the USB Type A and Type C jack. Since the USB Type A port is a non-controlled with respect to the power that it supplies, the power load manager 34 allocates a static amount of 10.5 W to the USB Type A jack, and controls the outlet 70d to reduce the total amount of power available for the USB Type C jack by the same amount. Therefore, the allocation for the USB Type C jack is limited to 30 W less 10.5 W, or 19.5 W. However, the outlet 70d is only 90% efficient, hence the amount available to the PED 72 is 90% of 19.5 W, or about 17.6 W at most. Notwithstanding, the power load manager controls the outlet 70d to communicate a power data object indicating a limit of 15 W for consistency with most power rule increments provided in the USB power delivery standard.

Various changes and modifications can be made as will be recognized by those of ordinary skill in the art. For example, while the seat box 10 includes media 22 storing a configuration file 23, the data on the configuration file could be stored within the power load manager 34 in a database. Alternatively, a configuration file could be stored on the entertainment system 26 and communicated to the power load manager 34 of each seat box 10 on power-up. In entertainment systems 36 including monitors 42, the distribution could take into account whether a monitor 42 is being used as well as an outlet 38 in controlling the supply of power from the outlet. As changes can be made as described, the present examples and described configurations are to be considered as illustrative and not restrictive and the invention is not to be limited to the details given herein, but may be modified within the scope and equivalence of the appended claims.

The invention claimed is:

1. A seat box for connection to an electrical power supply of a vehicle for making power available through power controlled outlets for a personal electronic device to connect to a power controlled outlet and receive power, the seat box comprising:
   a plurality of ports in which each port is configured to connect to a controlled power outlet;
   distribution circuitry including an input connectable to the vehicle electrical power system, and an output connected to each of the ports for receiving power from the vehicle electrical power system and distributing power among the ports for supply to a controlled power outlet connected to the port;

a processor connected in communication with each port configured to receive and send data to a power controlled outlet connected to the port; and a power load manager executed on the processor, the power load manager receiving data from each controlled power outlet connected to one of the ports, the data indicating power supplied from the controlled power outlet and requests for power from each controlled power outlet, the power load manager when receiving a request for power from a controlled power outlet for which there is insufficient power available to meet the request, controlling the controlled power outlet drawing the most power to reduce power supplied therefrom, and supplying at least some power to the controlled power outlet from which the request for power was received.

2. The seat box of claim 1, wherein if there is more than one controlled power outlet drawing substantially the same amount of power in which said amount of power is the most amount of power being supplied by any one controlled power outlet, the power load manager determines which controlled power outlet has been supplying said amount of power longer than any of the other controlled power outlets, and controls the determined controlled power outlet to reduce power supplied therefrom.

3. The seat box of claim 1, wherein the controlled power outlet from which the request for power was received, is a controlled power outlet that previous to the request had not been supplying power therefrom.

4. The seat box of claim 1, wherein each controlled power outlet reports to the power load manager connection of a personal electronic device to the controlled power outlet.

5. The seat box of claim 4, wherein the power load manager tracks the duration of time a personal electronic device has been connected to a controlled power outlet based on when a report was received from the controlled power outlet of connection thereto.

6. The seat box of claim 5, wherein each power controlled outlet reports disconnection of a personal electronic device to the power load manager, and in response to a report of disconnection, the power load manager resets the duration of time for that power controlled outlet.

7. The seat box of claim 1, wherein the power load manager communicates a power data object to a personal electronic device connected to a power controlled outlet indicating a power limit for that power controlled outlet, and communicates another power data object to a power controlled outlet for which power supplied therefrom is to be reduced.

8. A seat box for connection to an electrical power supply of a vehicle for making power available through power controlled outlets for a personal electronic device to connect to a power controlled outlet and receive power, the seat box comprising:

a plurality of ports in which each port is configured to connect to a controlled power outlet;

distribution circuitry including an input connectable to the vehicle electrical power system, and an output connected to each of the ports for receiving power from the vehicle electrical power system and distributing power among the ports for supply to a controlled power outlet connected to the port;

a processor connected in communication with each port configured to receive and send data to a power controlled outlet connected to the port; and a power load manager executed on the processor, the power load manager receiving data from each controlled power outlet indicating power supplied from the controlled power outlet and requests for power from each controlled power outlet; and storage media in communication with the power load manager in which the power load manager controls distribution of power among the controlled power outlets according to information in a configuration file on the storage media, the distribution being at least one of distributing power to a power controlled outlet first requesting the power with a predefined minimum amount of power supplied in response to another power controlled outlet requesting power later; and redistributing some power from one outlet to another in response to a later request for power, wherein said redistributing some power from one outlet to another in response to a later request for power is performed when there is insufficient power to meet the later request in which the power load manager controls the power outlet drawing the most power to reduce power supplied therefrom, and supplies at least some power to the controlled power outlet from which the later request for power was received.

9. The seat box of claim 8, wherein if there is more than one controlled power outlet drawing substantially the same amount of power in which said amount of power is the most amount of power being supplied by any one controlled power outlet, the power load manager determines which controlled power outlet has been supplying said amount of power longer than any of the other controlled power outlets, and controls the determined controlled power outlet to reduce power supplied therefrom.

10. The seat box of claim 8, wherein the controlled power outlet from which the later request for power was received, is a controlled power outlet that previous to the request had not been supplying power therefrom.

* * * * *